2,938,330

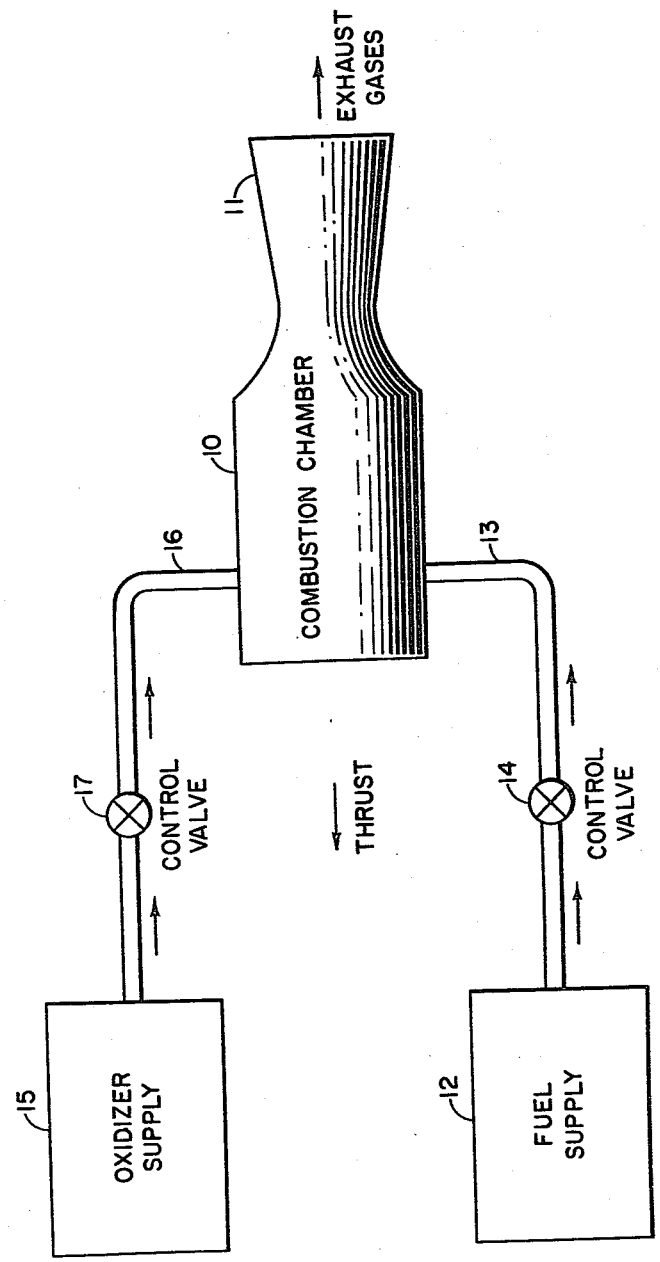

ROCKET PROPELLANT AND METHOD FOR OPERATING A ROCKET MOTOR OR THE LIKE

John J. Kolfenbach, North Plainfield, and Richard F. Finn, Iselin, N.J., assignors to Esso Research and Engineering Company, a corporation of Delaware Filed July 21, 1954, Ser. No. 444,792

5 Claims. (Cl. 60—35.4)

This invention relates to a propellant for a rocket motor or the like as well as to a method for operating such a motor using such a propellant, and more particularly to a propellant utilizing the oxidation of a conjugated diolefin by nitric acid.

In the past, rocket motors and the like have been operated by mixing a fuel and an oxidizer in a combustion chamber under conditions whereby they will be ignited either spontaneously or by some ignition means. In selecting the elements of such a propellant, a number of considerations must be taken into account. Among these are calorific value per unit volume of propellant, ease of storage of the propellant, the stability of the propellant, and its tendency to corrode the storage means. Hypergolic propellant systems, that is, those which ignite spontaneously on mixing the fuel and the oxidizer, are especially desired. In the past, it has been known that conjugated diolefins such as butadiene or cyclopentadiene will ignite spontaneously on contact with nitric acid with a resultant release of energy of a magnitude making it suitable as a rocket fuel. However, all of the conjugated dienes available in quantity, such as cyclopentadiene, butadiene, isoprene, etc., have high vapor pressures. For example, at atmospheric pressure butadiene-1,3 boils at —4.4° C., isoprene boils at 34° C., cyclopentadiene boils at 40.5° C., and trans piperylene boils at 43° C. These high vapor pressures necessitate the use of high pressure systems to maintain the compounds in liquid form, a step necessary in order to conserve space. Such high pressure systems result in a severe weight penalty for the rocket, and are therefore highly undesirable.

It is an object of the present invention, therefore, to provide a hypergolic propellant for rocket motors or the like wherein the fuel component is a liquid which has relatively low volatility and may be easily stored at ambient pressures and temperatures.

It is a further object of the invention to provide such a fuel component of a rocket propellant that will be easily convertible to a conjugated diolefin capable of spontaneous ignition with fuming nitric acid.

It is also an object of the invention to provide a fuel that has a high heat of combustion per unit volume.

It is a still further object of the present invention to provide a method for operating a rocket motor or the like involving the conversion of a fuel to a conjugated diolefin and subsequently oxidizing the diolefin so formed with fuming nitric acid.

These objects, and others, which will be in part apparent and in part subsequently pointed out, are attained by providing a propellant for rockets or the like comprising a hydrocarbon compositon consisting essentially of a compound which is converted to a conjugated diolefin at an elevated temperature and a promoter capable of releasing sufficient heat when contacted with an oxidizer to convert the compound to a conjugated diolefin which ignites spontaneously on contact with an additional quantity of the same or a different oxidizer. The oxidizer element of the propellant, which is preferably nitric acid, is provided in sufficient quantity and concentration to react with the promoter and with the conjugated diolefin formed.

The operation of the present invention may be better understood by reference to the accompanying single figure of drawings, which is a diagrammatic representation of a conventional rocket motor utilizing a bi-liquid propellant, namely, fuel and an oxidizer.

Turning now to the drawing, there is illustrated in diagrammatic form the combustion chamber 10 having a nozzle portion 11 from which the exhaust gases are ejected. Combustion occurs in the chamber 10. The ejection of the combustion gases from the rocket causes a reaction thrust driving the rocket forward. The liquid fuel is stored in the tank 12 and is introduced into the combustion chamber 10 through supply line 13 under control of the valve 14. The oxidizer, which is preferably fuming nitric acid, is stored in the oxidizer supply tank 15 and fed through line 16 controlled by valve 17 into the combustion chamber 10. Means are preferably provided for introducing the two elements of the propellant in spray form so that the reactive contact between them in the combustion chamber is promoted.

The fuel element of the propellant may be any liquid compound which will decompose at elevated temperatures to form a conjugated diene. As used in this specification, the term "elevated temperature" refers to temperatures above those to which the fuel might be raised in the course of handling and storage. Temperatures in excess of about 100° C. may be considered elevated temperatures for the purposes of this invention. The liquids tending to decompose into conjugated diolefins at lower temperatures are undesirable, since under some storage conditions they might tend to decompose spontaneously, as for example, when stored in tanks exposed to desert sun. Especially suitable compounds are polymers, including copolymers, of conjugated diolefins. One compound having the desired properties is dicyclopentadiene, which is a liquid having a property of decomposing at temperatures of about 130°–150° C. to form cyclopentadiene, which is a conjugated diolefin. Dicyclopentadiene is itself not a conjugated diolefin, and although it will react with nitric acid, it does not do so rapidly enough to permit its use alone as a hypergolic rocket propellant fuel. Other substances possessing the property of decomposing into conjugated diolefins include methyldicyclopentadiene, dimethyldicyclopentadiene, and homologues thereof, as well as butadiene dimer, butadiene-isoprene codimer, etc. Dicyclopentadiene or a hydrocarbon fraction rich in dicyclopentadiene is especially preferred. A particularly advantage of such compounds is their relatively high density and high heat of combustion, giving high heats of combustion per unit volume, a factor which is important because rockets are volume-limited. Dicyclopentadiene and dimethylcyclopentadiene, for example, have the relatively high densities of 0.974 and 0.940 respectively at 20° C., while the densities of gasoline and kerosene are substantially lower. The advantage, on a B.t.u per gallon basis, of the fuels of this invention over other hydrocarbon liquid fuels may be 80% or 90% or higher. For example, dicyclopentadiene gives 192,500 B.t.u./gallon, while gasoline and kerosene generally give 100,000 or lower.

The principal fuel constituent is admixed with an amount of a promoter which will react spontaneously with nitric acid, thereby liberating sufficient heat to raise the temperature of the principal fuel constituent to cause decomposition to a conjugated diolefin. Substances suitable as promoters are conjugated diolefins such as butadiene, isoprene, piperylene, and cyclopentadiene, alcohols such as ethanol, methanol, and furfuryl alcohol, and amino compounds such as aniline, mono ethyl aniline, mono methyl aniline, and hydrazine and its derivatives. Butadiene, isoprene, and piperylene are especially preferred as promoters. The amount of such promoter to be included in the principal fuel constituent should preferably be as small as possible in order that more principal fuel constituent may be employed. The amount of promoter used will depend upon the amount of heat it releases on reaction with nitric acid and the rate of such heat release. The amount of promoter used is preferably such that ignition will occur in a fraction of a second, such as 100 milliseconds or less, preferably 50 milliseconds or less, when intimately contacted with nitric acid in the rocket. Generally, however, it has been found that between about 2% and about 20% by weight concentration of promoter is adequate to raise the temperature of the principal fuel constituent to a point sufficient to cause it to decompose into conjugated diolefins and ignite. In the case of dicyclopentadiene employed as the principal fuel constituent with butadiene as the promoter, it has been found that about 4% by weight of butadiene is adequate. On the other hand, it will be appreciated that larger amounts of promoter, up to 70% or more, can be employed without departing from the spirit of the invention. As will be more particularly pointed out in the subsequent example, a dicyclopentadiene composition containing about 10–20% of isoprene is highly effective as a fuel composition.

When nitric acid is employed as the oxidizer it should be concentrated, and preferably should be fuming, i.e., contain a high concentration of nitric oxide. Such a concentrated acid is preferred in order to promote rapid reaction with both the promotor and the principal fuel constituent. Although nitric acid is the preferred oxidizer, it is to be understood that other oxidizers such as oxygen or air may be employed. The propellant is therefore also useful as a fuel for a ram-jet or similar type engine.

A small amount of inhibitor in order to stabilize the fuel constituents, such as 0.005% of tertiary butyl catechol, hydroquinone, 2,6-di-t-butyl-p-cresol, α-naphthol, benzyl-p-aminophenol, N,N'-dibutyl-p-phenylene diamine, may also advantageously be included.

EXAMPLE

As an example of the effect of conjugated diolefins in promoting the oxidation of dicyclopentadiene by nitric acid, a number of compositions were mixed with fuming nitric acid by directing streams of the material and nitric acid together against an aluminum panel. In each case the volume ratio of nitric acid to dicyclopentadiene was 5/1. This represented a molar ratio of about 3.1 times the molar ratio of nitric acid to dicyclopentadiene that would be theoretically necessary to produce complete combustion of the dicyclopentadiene.

Dicyclopentadiene which is produced as a by-product in the high temperature steam cracking of gas oil is particularly suited as the fuel composition of the present invention because it already contains isoprene, as shown by the following analysis:

| Compound | Vol. Percent |
|---|---|
| Dicyclopentadiene | 69.9 |
| Methyldicyclopentadiene | 20.4 |
| Acyclic dienes—(isoprene, etc.) | 3.4 |
| Codimer—Mol. Wt. 134 (Dicyclopentadiene codimer with isoprene, etc. side chain) | 4.4 |
| Codimer—Mol. Wt. 148 (Methyl dicyclopentadiene with isoprene, etc. side chain) | 1.3 |
| Dimethyl dicyclopentadiene | 0.6 |

This mixture is referred to herein as "by-product dicyclopentadiene." The nitric acid employed had a specific gravity of 1.49 to 1.50 and contained a minimum of 90% $HNO_3$ and a maximum of 10% $H_2O$.

The results of the tests are set forth in Table I below.

Table I

| Composition | Spontaneous Ignition on Aluminum Panel |
|---|---|
| Pure dicyclopentadiene | No. |
| Pure dicyclopentadiene+8-10% isoprene | Yes. |
| By-product dicyclopentadiene | Yes. |
| By-product dicyclopentadiene+8-10% isoprene | Yes (Most Rapid). |

These results clearly illustrate the necessity of including a promoter in order to supply sufficient heat to depolymerize the dicyclopentadiene and cause it to ignite with the nitric acid. They also indicate that the most effective fuel composition is that obtained by adding isoprene to by-product dicyclopentadiene which already contains about 3% of this substance, so that a composition containing at least about 10% isoprene is preferred.

While a specific embodiment of the present invention has been described, it will be understood that the invention is not to be limited to such a specific embodiment, but that it embraces the use of those equivalents which will occur to those skilled in the art.

What is claimed is:

1. In the operation of a rocket engine wherein a nitric acid oxidizer and a hydrocarbon polymer selected from the group consisting of dicyclopentadiene, methylated dicyclopentadiene, butadiene dimer and butadiene-isoprene codimer are introduced into the combustion chamber of the engine and reacted to form thrust-producing gases, the improvement which comprises introducing into said combustion chamber with said polymer from about 2% to about 20% by weight, based on the polymer, of a conjugated diolefin selected from the group consisting of butadiene, isoprene, cyclopentadiene and piperylene.

2. The improvement defined by claim 1 wherein from about 10 to about 20 wt. percent of said diolefin is introduced with said polymer.

3. The improvement defined by claim 1 wherein said polymer is dicyclopentadiene.

4. The improvement defined by claim 1 wherein said diolefin is isoprene.

5. The improvement defined by claim 1 wherein said acid is fuming nitric acid.

References Cited in the file of this patent

UNITED STATES PATENTS

| | | |
|---|---|---|
| 2,489,051 | Sayward et al. | Nov. 22, 1949 |
| 2,573,471 | Malina et al. | Oct. 30, 1951 |
| 2,636,054 | Johnson | Apr. 21, 1953 |
| 2,636,056 | Jones | Apr. 21, 1953 |
| 2,707,716 | Price | May 3, 1955 |
| 2,712,497 | Fox et al. | July 5, 1955 |
| 2,842,936 | Ayers et al. | July 15, 1958 |

OTHER REFERENCES

Zucrow: "Journal of the American Rocket Society," No. 72, December 1947, pages 26–38.

Trent et al.: "Journal of the American Rocket Society," vol. 21, September 1951, pages 128–131.